A. B. BREEZE & J. CARR.
UNIVERSAL JOINT.
APPLICATION FILED APR. 15, 1918.
1,276,695. Patented Aug. 20, 1918.
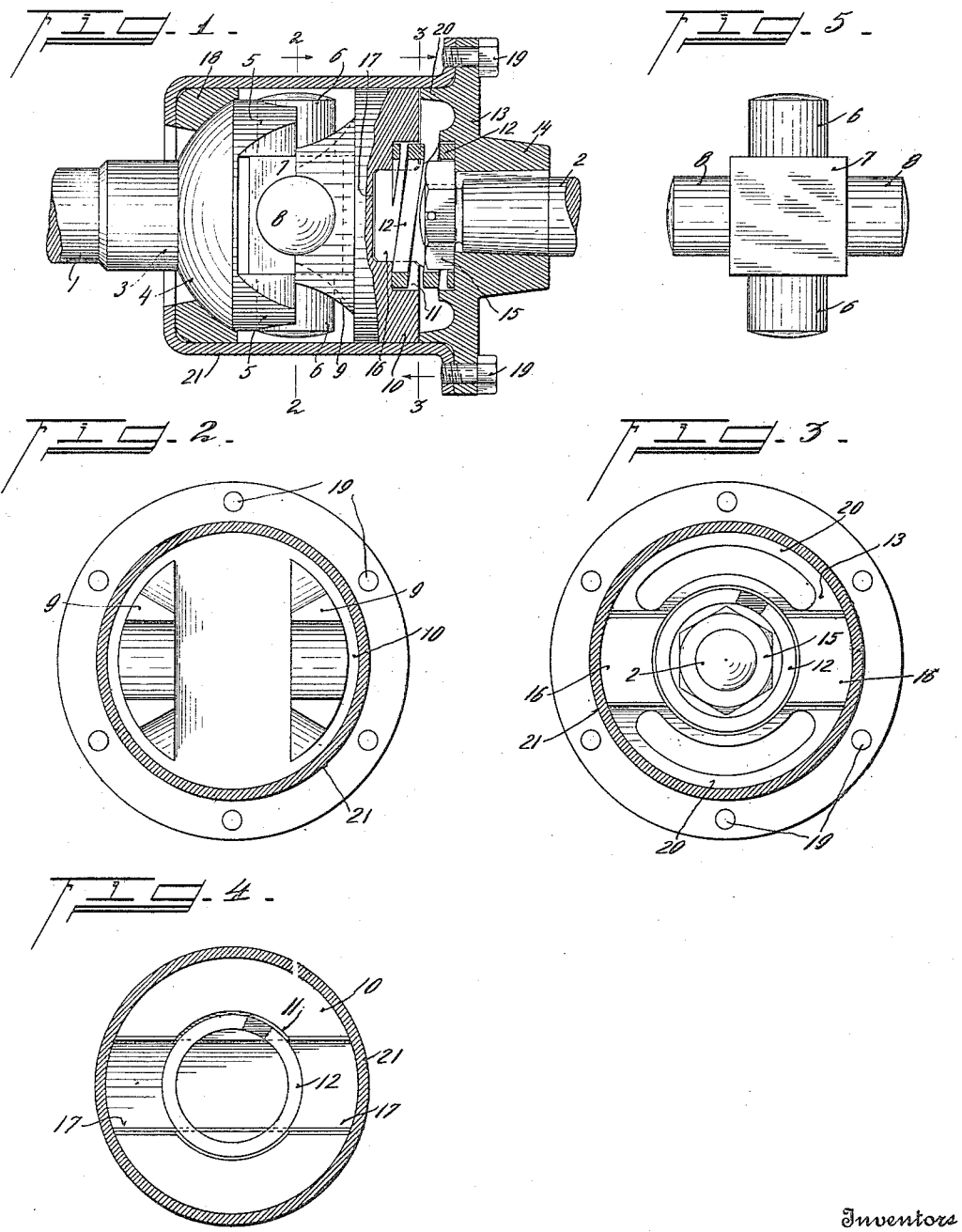

UNITED STATES PATENT OFFICE.

ALFRED B. BREEZE, OF CINCINNATI, OHIO, AND JAMES CARR, OF SYRACUSE, NEW YORK, ASSIGNORS TO THE CINCINNATI BALL CRANK CO., OF OAKLEY, CINCINNATI, OHIO, A CORPORATION OF OHIO.

UNIVERSAL JOINT.

1,276,695.  Specification of Letters Patent. Patented Aug. 20, 1918.

Application filed April 15, 1918. Serial No. 228,531.

*To all whom it may concern:*

Be it known that we, ALFRED B. BREEZE, a citizen of the United States, and residing at Cincinnati, in the county of Hamilton and State of Ohio, and JAMES CARR, a citizen of the United States, and residing at Syracuse, in the county of Onondaga and State of New York, have invented a new and useful Improvement in Universal Joints, of which the following specification is a full disclosure.

This invention relates to improvements in universal joints, and its object is to provide a device of this character which will be simple and strong in construction, easily assembled or disassembled, without the use of special tools; to provide for lubrication and for retaining the lubricant; to provide for a relatively large area of bearing surface between the torque coupling parts and which is not lessened by the wearing of the joint; and to provide a casing inclosing the coupling parts and for holding the parts in their assembled position under tension, to provide for a relief motion to undue strains in an axial direction.

The invention consists essentially of two jaw members, as driving and driven shaft heads, clutching and swiveling upon relative right angled axis of a cross-shaped torque coupling member therebetween, one of the heads being of two-part form, having a spring under tension intervening therebetween, and a casing as draft connection between said shaft heads having a universal bearing on the one and rigid on the other, the spring urging and maintaining the parts in relatively engaged positions to accommodate for wear and thrust strains.

Further objects and features, some relating to structural details, will definitely appear from the detailed description of the accompanying drawings, illustrating a preferred embodiment of the invention, and forming a part of this specification in the drawings like characters of reference denote corresponding parts throughout the several views of which:—

Figure 1 is a central section of the incased universal joint embodying the features of our invention.

Fig. 2 is a section on line 2, 2, Fig. 1.

Fig. 3 is a section on line 3, 3, Fig. 1, viewed from the left.

Fig. 4 is a section on the same line viewed from the right.

Fig. 5 is a plan view of the trunnion torque coupling.

Referring to the drawings, 1 and 2 indicate the shaft members, of which either may be a driving member and the other the driven member. A jaw-head 3 is fixed upon the end of the shaft member 1, and formed to provide a spherical rear face 4 and a pair of yoke-shaped jaws 5, 5, relatively diametrically disposed, each having a socketed engagement respectively with trunnions 6, 6, of the cross-shaped coupling 7. The coupling 7 has a second pair of relatively opposite trunnions 8, 8, at right angles to the trunnions 6, 6, respectively having a socketed engagement with the diametrically disposed yoke jaws 9, 9, projecting from one side of the annular follower plate 10. The opposite face of the follower plate 10 centrally has a recess 11 providing a seat for one end of a spring 12. The opposite end of the spring 12 seats into a recess formed in the head-plate 13 provided with a hub 14, keyed and secured upon the end of the shaft member 2. The bore of the hub is tapered to receive the tapered end of the shaft member 2 and wedged thereon by a nut 15 screw threaded upon the end of the shaft member 2. The head-plate 13 is therefore rigidly fixed and keyed upon the end of the shaft member 2, and therefore provides an abutment for the spring 12.

The inner face of the head plate 13 has a pair of keys or clutch teeth 16, 16, projecting therefrom, engaging respectively into corresponding notches 17, 17, formed in the outside face of the follower plate 10 for rotatively coupling the head and follower plate and permitting the follower plate to be moved axially by the spring 12. The spring 12 is interposed between said plate under a tension sufficiently to maintain the coupling jaws of the head 3 and follower engaged with the coupling 7, and also forcibly engage the spherical face 4 of the head 3 against a correspondingly curved or concaved seat surface of a metallic ring 18, fitting within one end of the cylindrical casing 21. This end of the casing has a right angled annular flange for confining the ring or removable seat 18, and the opposite end of the casing is flanged outwardly, fitting against and secured to the head-plate 13. The casing is secured to the head-plate 13 by a series of screws 19 or bolts at spaced points around the head-plate. The head-plate 13 is provided with an annular flange 20 projecting from its inside face, fitting within the interior of the casing 21, which serves to reinforce the head-plate and also assists in making an oil-tight joint between the casing and head-plate 13.

In a universal motion the casing or draft member 21, head plate 13 and follower clutch member 10, as a unit swivel upon the trunnions 8—8 of the cross coupling 7 while the shaft head 3 swivels or swings upon the trunnions 6—6 of the coupling 7 and its spherical portion slides upon the annular seat or ring 18. The head 3 being constantly engaged against the seat through the force of the spring 12, maintains a seal to prevent the escape of the lubricant within the casing. The seat or ring 7 is preferably made of bronze and being removable can be renewed when worn.

The casing 21 constitutes a draft connection between the shaft heads, being removably fixed to the head-plate 13 and has a universal bearing on the spherical surface 4 of the head 3. The joint can be easily disassembled, while in use, by removing the screws 19 and slipping the casing endwise over the shaft 1, which affords convenient access to the coupling parts, for removal of any one of them in case of breakage. The follower plate may be regarded as a part of the head-plate 13 or as a horizontal thrust and torque coupling member, provided with an axially movable connection between the cross-shaped torque coupling member 7 and shaft head 3, which under the force of the spring 12 is forced against the cross-shaped torque coupling member, and thereby forces the shaft-head 3 against the packing ring of the casing, either shaft 1 or 2 being movable longitudinally.

The shaft head 3 and follower 10 each provide a socket connection for the cross coupling 7 and therefore engage one half of the peripheries of the studs or trunnions of the coupling. This enables the coupling to be transposed when said parts become worn, which is readily accomplished by reason of the loose connection of the parts in a direction lengthwise of the joint axis.

Having described our invention, we claim:—

1. In a universal joint, the combination with drive and driven members, of an intermediate member relatively coupled to said drive and driven members and upon which said members swivel at right angles to each other, one of said members being of two-part form relatively connected and one part constituting an intermediate yielding thrust bearing, a spring interposed between the parts of said member and a draft connection between said drive and driven member, having a universal bearing concentric on the one and rigid on the other.

2. In a universal joint, the combination of drive and driven members, a torque coupling member therebetween, and a casing inclosing said torque connection, constituting a draft connection between said drive and driven members removably fixed to one member, and having a ring confined therein and universally bearing on the other of said members.

3. In a universal joint, the combination of drive and driven members, each having clutch bearing arms projecting therefrom, and those of one disposed at right angles to those of the other, a torque coupling member therebetween, loosely engaged by and bearing in said clutch arms, and a casing inclosing the aforesaid parts constituting a draft connection between said drive and driven members for holding the parts together, fixed to one and having a universal bearing on the other.

4. In a universal joint, the combination of drive and driven members, each having clutch arms projecting therefrom, a cross-shaped torque coupling member engaged with the clutch arm of one of said drive or driven members, a follower thrust and torque member engaged with said cross-shaped torque member and the other drive or driven members, and yieldingly urged in an axial direction, a spring therefor, and a draft member for connecting said drive and driven members.

5. In a universal joint, the combination of drive and driven members, each having clutch arms projecting therefrom, a cross-shaped torque coupling member engaged with the clutch arm of one of said drive or driven members, a follower thrust and torque member engaged with said cross-shaped torque member and the other drive or driven members, and yieldingly urged in an axial direction, a spring therefor, and a draft member for connecting said drive and driven members rigidly fixed to one and having a universal bearing on the other.

6. In a universal joint, the combination of drive and driven members, each having clutch arms projecting therefrom, a cross-shaped torque coupling member engaged with and bearing in the clutch arms of one of said drive or driven members, a thrust and torque follower member engaged with said cross-shaped torque member and the clutch arms of the other drive or driven members, a spring under tension intermediate said follower member and drive or driven members, with which said follower connects, and a lubricant tight casing constituting a draft connection between said drive and driven members fixed to one of said members and internally carrying a packing ring having a universal bearing on the other of said members.

7. In a universal joint the combination of a pair of shaft members, a cross-shaped torque coupling member having a swivel connection with one of said shaft members, a follower thrust and torque member rotatively connecting with the other of said shaft members and having a swivel connection with said coupling members, a spring interposed between said follower and shaft members, and a casing draft member holding said parts together in a direction axially of the shaft members.

8. In a universal joint the combination of a pair of shaft members, a cross-shaped torque coupling member having a swivel connection with one of said shaft members, a follower torque coupling member rotatively connected with the other of said shaft members and having a swivel connection with said cross-shaped torque coupling member, a spring interposed between said follower and shaft members and a draft member for connecting and inclosing said parts rigidly fixed to one shaft member and having a universal bearing on the other shaft member.

9. In a universal joint the combination of drive and driven members, a pair of hingedly engaged torque coupling members therebetween, one thereof hingedly engaged to one drive or driven member and the second rotatively engaged with the other drive or driven member, and a draft member holding said parts together axially fixed to one of said drive members and having a universal bearing on the other.

10. In a universal joint the combination with two shaft members one having a spherically curved rear face, a trunnion torque coupling member pivotally engaged with one of said shaft members, a follower torque coupling member pivotally engaged with said other coupling member and rotatively engaged with the other shaft member, a spring interposed between said follower and shaft members, a draft member rigidly fixed to one of said shaft members and bearing against the spherical face of the other shaft member.

In witness whereof, we hereunto subscribe our names, as attested by the subscribing witnesses.

ALFRED B. BREEZE.

Witnesses:
  CLIFFORD GREENE,
  L. A. BECK.

JAMES CARR.

Witnesses:
  DONALD O. BRUCE,
  W. W. BOOTHE.